May 23, 1950 R. H. HERRICK 2,508,642

FOLDING HANDSET

Filed May 1, 1947

INVENTOR.
ROSWELL H. HERRICK

BY Chas. M. Candy
ATTORNEY

Patented May 23, 1950

2,508,642

UNITED STATES PATENT OFFICE 2,508,642

FOLDING HANDSET

Roswell H. Herrick, Lorain, Ohio, assignor to Automatic Electric Laboratories, Inc., Chicago, Ill., a corporation of Delaware Application May 1, 1947, Serial No. 745,203

6 Claims. (Cl. 179—103)

This invention relates to telephone and loud-speaker substation apparatus and more particularly to hand sets and mountings for handsets.

This invention contemplates the provision of a hand-set talking unit comprising a telephone transmitter and receiver for use with other equipment as a telephone instrument or in a loudspeaker sub-set. This unit is complete in itself but so constructed as to be partially folded and fitted into a recess in the base portion, when not in use, in such a manner that the whole presents practically an unbroken sweep in the lines of the base or cabinet portion, while at the same time allowing removal and use of the hand-set in the normal manner.

An object of this invention is to provide a hand-set unit equipped with standard type transmitter and receiver units, in which the transmitter housing is hinged to one end of handle portion of the unit and the receiver housing is hinged to the opposite end of the handle portion, in such a manner that, when not in use and when pressure is released from a grip bar and when the receiver portion is no longer pressed against the ear of the user, the spring member within the handle will draw the housings of the transmitter and receiver hinged portions into a collapsed position against the opposite ends of the handle portion. The hand-set is now inserted into the recessed portion of the base member and conforms to the contour thereof and to assume the appearance of a portion of the base.

Another object of this invention is to provide a handset in which a grip bar in the handle portion acts against slight spring pressure, when the handset is lifted for use, to cause the transmitter and receiver housings to be unfolded from their collapsed positions and in position for use as a regular handset.

Another object of this invention is to provide a compact handset to fit crosswise of a loud-speaker sub-set or across a handset telephone base and which will be given a contour, when in its folded position, to agree with that of the cabinet or base member into which it would normally fit.

One of the features of this invention is to provide in the base portion, of the telephone or loud speaker cabinet, a take-up reel for the hand-set cord, thus housing the cord within the cabinet when the handset is not in use, to further improve the appearance of the complete set.

Another feature of this invention is the provision of simple lever action and interlinkage of the receiver and transmitter housings with the grip bar for maintaining the transmitter and receiver housings in their talking and listening positions by slight pressure of the receiver against the ear when in use, without the necessity of maintaining a grip on the grip bar in the handle member.

The foregoing and other objects and features will be apparent from a perusal of the description which follows, reference being had to the accompanying drawings.

Figures 1, 3:
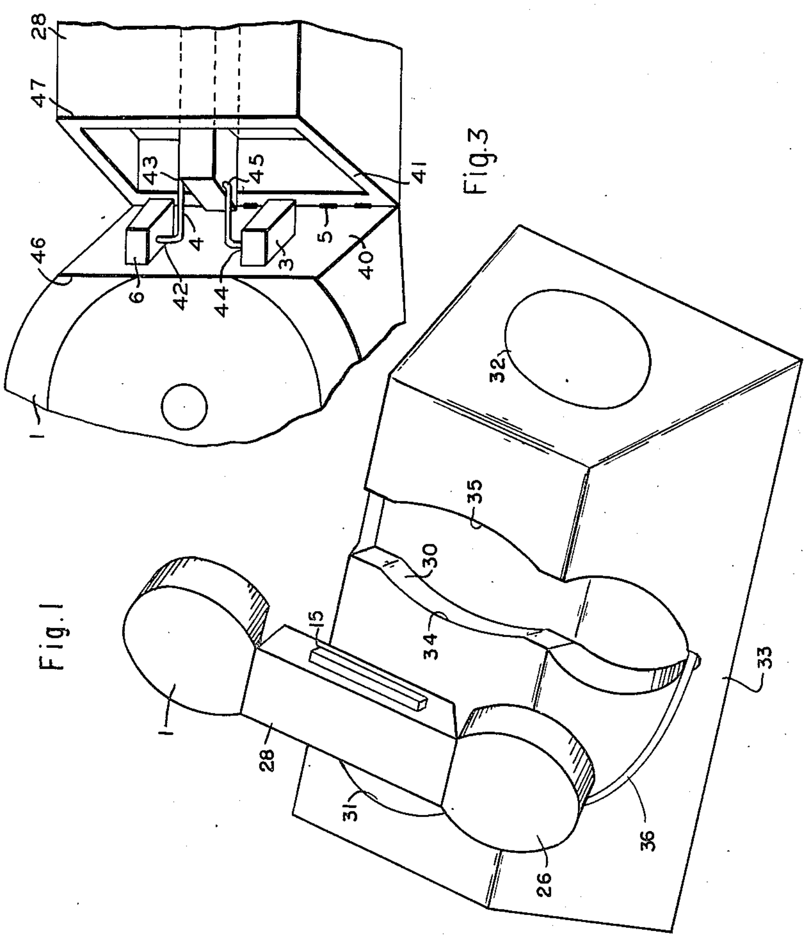

Figure 1 shows a base assembly 33 for a telephone instrument or a loud speaker sub-set, together with a folding handset of this invention.

Figure 2:
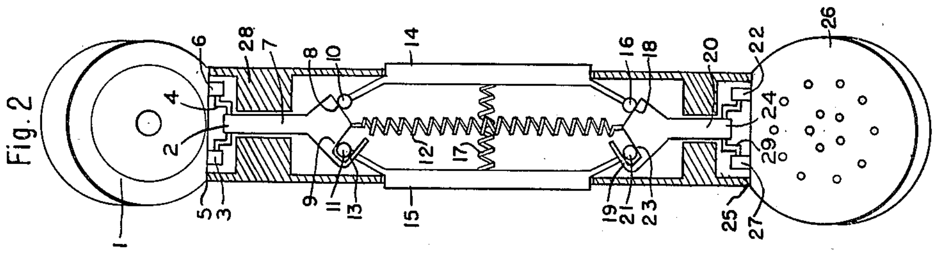

Figure 2, partly in cross-section, shows the details of the grip bars 14 and 15 fitted into the handset handle, together with hinged receiver housing 1 and the hinged transmitter housing 26.

Figure 3 shows an enlarged view of the arrangement for rotating the receiver housing in respect to the handle 28.

It will be noted in Figure 1 that the handset cord 36 is arranged to pass through an opening in the recessed portion 30 of the top of the base member 33 to a cord take-up reel (not shown) in the interior of the base and when the hand-set unit is not in use and returned to its resting place the cord will be completely concealed within the base. The opening 31 in the top of the base is an opening above a loud speaker (not shown), the opening 32 is an opening in front of the microphone (not shown) which also mounts the telephone dial, or calling device (not shown).

The receiver unit 1 and the transmitter unit 26 are partly unfolded in Figure 1, the receiver unit 1 being unfolded to a greater degree than the transmitter unit, which would be the case in normal use. One grip bar 15 is shown, the other grip bar 14 (not shown) is on the opposite side of the handset handle 28, from the grip bar 15. At points 34 and 35 the recessed portion 30 has been enlarged to make a space for the fingers of the user when lifting or replacing the hand-set on the base portion 33.

In the plan view Figure 2, the details of the grip bars 14 and 15 are shown. The outside edges of these two grip bars would, when not in use, extend beyond the surface, on the opposite sides of handle 28. These grip bars would respond to slight pressure of the hand when the handset is lifted for the purpose of placing the receiver 1 to the ear, causing the receiver housing unit 1 and the transmitter housing unit 26 to partly unfold from their collapsed position.

As soon as the handset has been adjusted to a speaking and listening position, the ordinary light pressure of the receiver against the ear, which is common practice when using a handset, is sufficient to maintain the receiver and transmitter in correct relationship to the mouth and ear of the user and it is not necessary to hold a firm grip on the grip bars 14 and 15. Rollers 10 and 16 on the opposite ends of grip bar 14 and also the rollers 11 and 21 on the opposite ends of grip bar 15 are provided to furnish a smooth working lever action which operates against push bars 2 and 24 to unfold the transmitter and receiver units from their collapsed positions, with only slight pressure on the grip bars.

The unique construction of the push bars 2 and 24 is to be noted. The push bar 2 passes through the end of the handset handle 28 being guided by a key-way which allows smooth and easy working of the push bar 2, when the grip bars 14 and 15 are pressed inwards. A spring 12 restores the push bar 2 when the grip bars are released from hand pressure. The lower end of push bar 2—that is the end within the handle 28, is provided with two slanting surfaces 8 and 9 against which the rollers 10 and 11 operate to force the bar 2 upwards against slight spring pressure from spring 12. The lower end of push bar 2 is also provided with a hook arrangement 13 which, together with a similar hook 19 at the inner end of push bar 24, acts to prevent the collapse of the transmitter and receiver housings from their extended positions, during the time the receiver housing 1 is held with slight pressure against the ear. The push bar 2 is attached to lugs 3 and 6 on the receiver housing 1 through a coupling unit 4, so formed as to act hingelike when the push bar 2 moves up and down, or in and out, while at the same time the housing 1 is caused to move forward and back from its anchored point by the hinge member 5. It will be noted that a similar arrangement is provided in connection with the transmitter housing, that is a push bar 24 equipped on its upper or inner end with two slanting surfaces 18 and 23, and a hook arrangement 19. Also this push bar 24 is attached, through a coupling unit 29 with hinge-like action, to two lugs 22 and 27 on the transmitter housing 26. The construction is completed by inserting the spring 17, to exert a slight outward pressure on the two grip bars 14 and 15, to completely restore these to their normal positions when hand pressure is released and the receiver is no longer held with slight pressure against the ear of the user, and at the same time the spring 12 exerts its pressure to draw the push bars 2 and 24 inwards to collapse both the receiver housing 1 and the transmitter housing 26 to their folded positions.

Figure 3, in more detail, shows the receiver housing unit 1, in an open position in relation to the handset handle, that is, in a partially unfolded condition. The unique construction is clearly illustrated and the above termed, hinged like action, can be understood. When the push bar 2 moves in or out, in relation to the handset handle as mentioned above, the coupling unit 4 is also moved and therefore the top edge 46 of the slanting surface of the receiver unit 1, is moved closer or further away from the top edge 47 of the end surface 41 of the handset handle. As the lower edge of the receiver unit 1 is attached by the hinge member 5 to the lower edge of the handset handle 28, the point 42 on lug 6 would be in a slightly higher plane, when the receiver 1 is collapsed against the handset handle 28, than point 43 on the push bar 2 where a portion of the couping unit 4 passes through a hole near the end of push bar 2, and point 44 on lug 3, at the same time, would be in a slightly higher plane than point 45 on push bar 2. Therefore, the coupling unit 4 together with the mounting arrangement of lugs 3 and 6, on the receiver unit 1, provide the means for smooth operation of receiver unit 1 when the top edge of the slanting surface 40 is moving closer or further away from the top edge 47 of the handset handle, in response to the in and out movements of push bar 2, as explained above. The mounting of the transmitter unit is the same as described above for the receiver.

The features of the invention having been described, what is considered to be new and desired to have protected by Letters Patent, will be pointed out in the appended claims.

What is claimed is:

1. A hand set comprising a handle member, a transmitter housing unit movably attached to one end of said handle and having a talking position and a collapsed position, a receiver housing unit movably attached to the opposite end of said handle from said transmitter unit and having a listening position and a collapsed position, two push bars slidably mounted in opposite ends of said handle member, two grip bars slidably mounted in said handle member with their outer surface extending beyond the surface of said handle member, rollers on each end of each of said grip bars, a first coupling unit pivotally attached to said transmitter unit and pivotally attached to one end of one of said push bars, a second coupling unit pivotally attached to said receiver unit and pivotally attached to one end of the other one of said push bars, slanting surfaces on the opposite end of each said push bar co-operating with said rollers on each of said grip bars to cause endwise movement of said push bars when said grip bars are actuated, and said units movable to their said listening position and said talking positions respectively in response to pressure in an inward direction on said grip bars and endwise movement of said push bars.

2. A telephone hand set comprising a hand set handle equipped with a grip bar and transmitter and receiver housings, said receiver housing hinged to said handle and having a collapsed position and a usable position, means for moving said receiver housing into said collapsed position when not in use, and means for moving said receiver housing to usable position in response to said grip bar being manually pressed by the hand when said hand set is lifted by said handle.

3. A telephone hand set comprising a hand set handle equipped with a grip bar, a transmitter housing movably attached to said handle, means for mechanically coupling said transmitter housing to said grip bar, said transmitter housing having an unusable position and a usable position, and means including said coupling means for moving said transmitter from said unusable position to said usable position in response to said grip bar being manually pressed by the hand of the user.

4. A telephone hand set comprising a hand set handle equipped with a grip bar, a spring causing the surface of said grip bar to protrude beyond the surface of said hand set handle, a receiver housing movably attached to said handle, means for mechanically coupling said receiver housing to said grip bar, said receiver housing having an unusable position and a usable position, means including said coupling means for moving receiver housing from said unusable position to said usable position in response to said grip bar being manually pressed against said spring by the hand of the user.

5. A hand set comprising a handle member with a transmitter housing member movably attached to one end of said handle and a receiver housing member movably attached to the opposite end of said handle, a spring for moving said transmitter housing member and said receiver housing member into a collapsed position when not in use and a plurality of push bars and a plurality of coupling units for moving said transmitter housing member into a talking position and for moving said receiver housing member into a listening position in response to the gripping of said handle members in the usual manner when said hand set is brought into use.

6. A telephone hand set comprising a handle with a transmitter housing and a receiver housing movably attached thereto, a plurality of grip bars fitted into said handle, a grip bar spring fitted into said handle to cause one surface of said grip bars to extend beyond the surface of said handle, two push bars fitted into said handle with one end of each push bar protruding beyond the ends of said handle, one end of one said push bar attached to said transmitter housing and one end of another said push bar attached to said receiver housing, the other end of each of said push bars arranged within said handle and collaborating with rollers attached to said grip bars, a spring within said handle with one end attached to one said push bar and the other end attached to the other said push bar, said spring tensioned to draw together within said handle the one said end of said push bars, said push bars moved outwards against the tension of said spring when said grip bars are compressed to cause said transmitter housing and said receiver housing to move into their respective talking and listening positions.

ROSWELL H. HERRICK.

REFERENCES CITED

The following references are of record in the file of this patent:

UNITED STATES PATENTS

| Number | Name | Date |
|---|---|---|
| D. 135,495 | Diannini | Apr. 13, 1943 |
| D. 141,425 | McKenna | May 29, 1945 |
| 786,041 | Lind | Mar. 28, 1905 |
| 1,340,955 | Herrman | May 25, 1920 |

FOREIGN PATENTS

| Number | Country | Date |
|---|---|---|
| 22,091 | Denmark | Apr. 30, 1917 |